United States Patent [19]

Takahara et al.

[11] Patent Number: 4,906,071

[45] Date of Patent: Mar. 6, 1990

[54] LIQUID CRYSTAL DISPLAY DEVICE AND VIDEO PROJECTOR INCORPORATING SAME WITH PARTICULAR DRIVING CIRCUIT CONNECTION SCHEME

[75] Inventors: Hiroshi Takahara; Hitoshi Noda, both of Osaka; Mamoru Takeda, Hirakata; Yoshito Miyatake, Neyagawa; Yasuhiro Horio, Osaka, all of Japan

[73] Assignee: Matsushita Electric Industrial Co., Ltd., Osaka, Japan

[21] Appl. No.: 175,409

[22] Filed: Mar. 28, 1988

[30] Foreign Application Priority Data

Mar. 31, 1987 [JP] Japan .................. 62-77718
Mar. 31, 1987 [JP] Japan .................. 62-77708

[51] Int. Cl.⁴ .............................. G02F 1/13
[52] U.S. Cl. ............................ 350/331 R; 350/332; 350/334; 350/336; 353/20; 353/31; 353/97; 353/122
[58] Field of Search .............. 350/331 R, 332, 336, 350/334; 353/20, 25, 31, 97, 122, 34, 37

[56] References Cited

U.S. PATENT DOCUMENTS 4,058,970 11/1977 Ichinose .................. 350/332 X
4,362,903 12/1982 Eichelberger et al. ......... 350/336 X
4,408,836 10/1983 Kikuno ..................... 350/336 X

FOREIGN PATENT DOCUMENTS 60-3291 1/1985 Japan .
60-220317 11/1985 Japan .

Primary Examiner—Andrew J. James
Assistant Examiner—Richard Gallivan
Attorney, Agent, or Firm—Wenderoth, Lind & Ponack

[57] ABSTRACT

The invention relates to a liquid crystal display device and a projection TV using same. The liquid crystal display device has microfine conductive bumps formed on terminals of a liquid crystal display panel, and a conductive joint layer formed on each conductive bump. The display panel is connected to wiring leads formed on a substrate provided thereon an IC drive circuit. The projection TV employs a liquid crystal display device in which three liquid crystal display panels corresponding to three colors, red, green, and blue, are mounted on a single substrate. Light beams are made incident on the respective panels, and light beams transmitted through or reflected from specified pixels are projected on a screen to form an image.

21 Claims, 13 Drawing Sheets

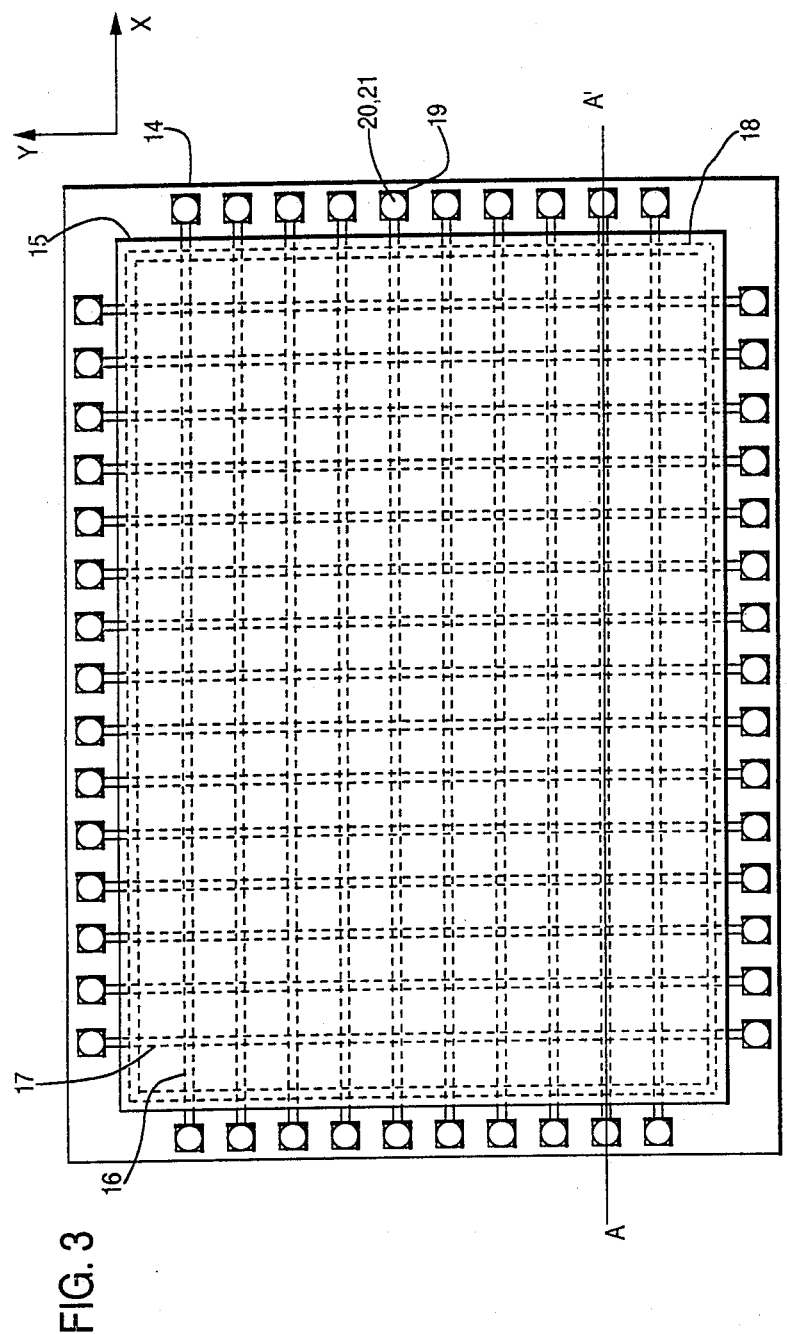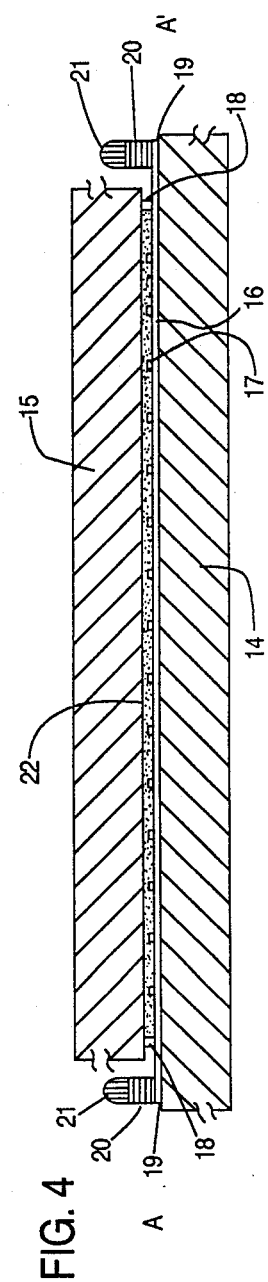
FIG. 3
FIG. 4

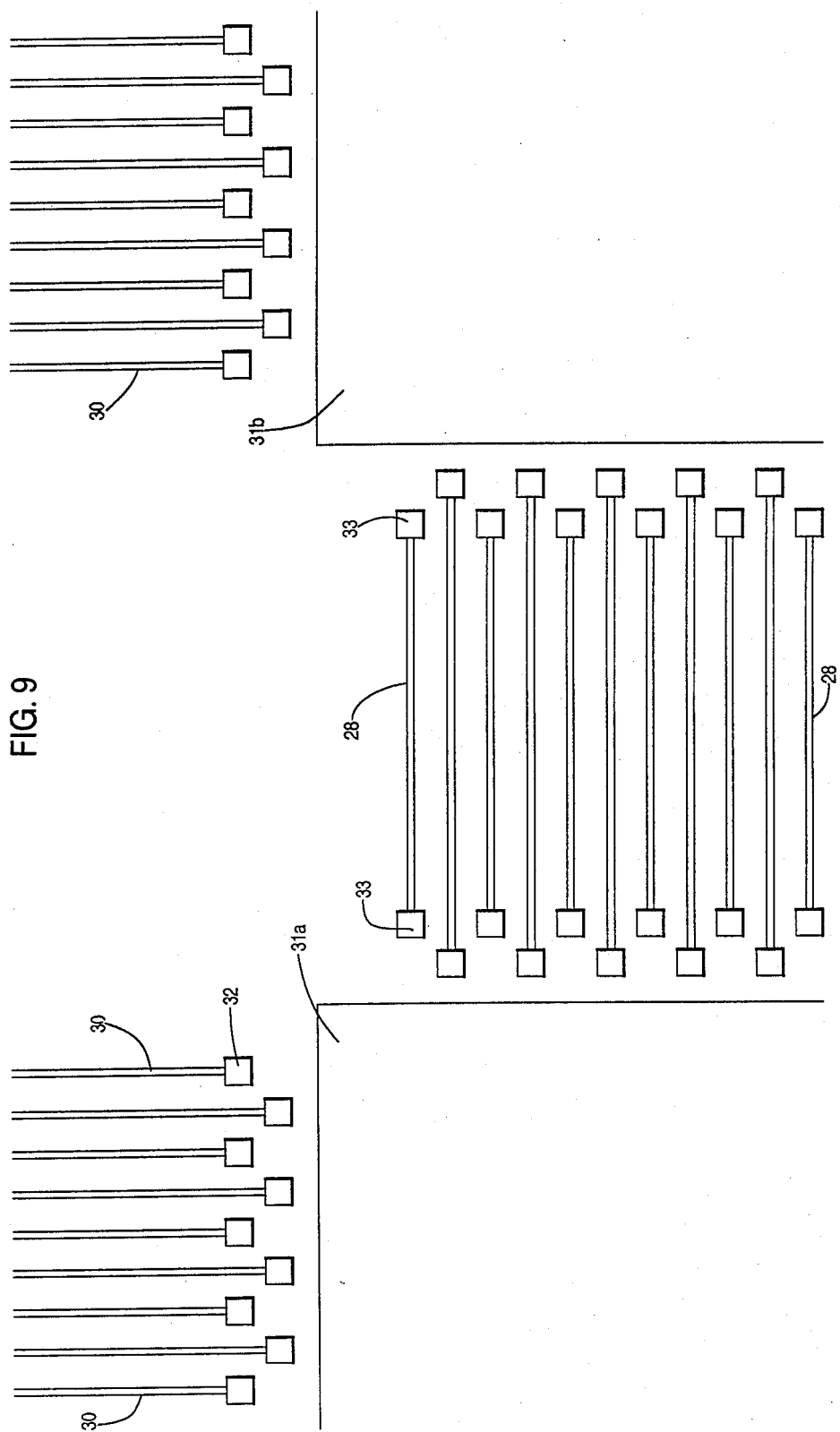

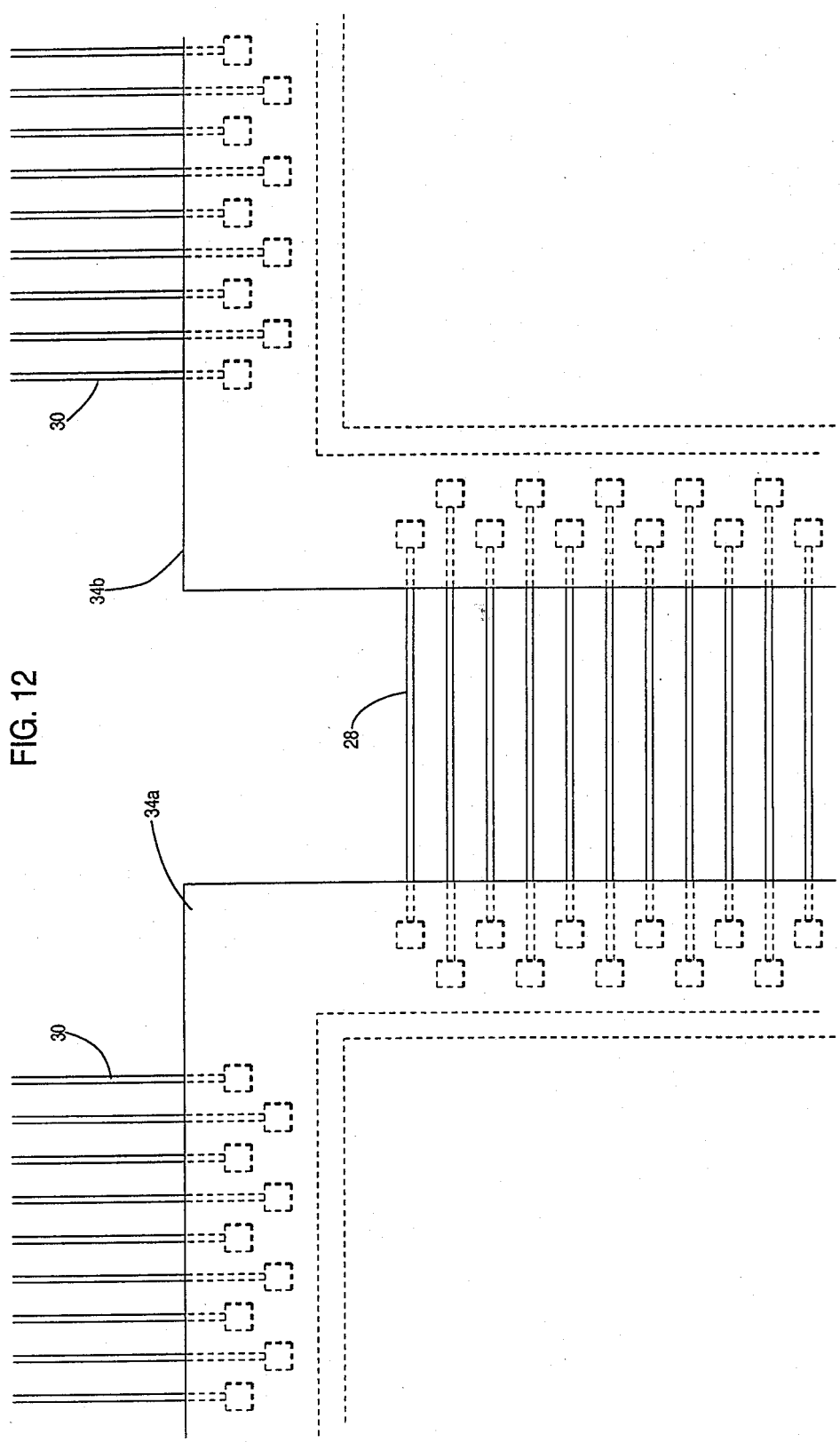

LIQUID CRYSTAL DISPLAY DEVICE AND VIDEO PROJECTOR INCORPORATING SAME WITH PARTICULAR DRIVING CIRCUIT CONNECTION SCHEME

BACKGROUND OF THE INVENTION

1. Field of the Invention

The present invention relates to a liquid crystal display device for use in a video projector, and a projection TV incorporating same.

2. Description of the Prior Art

Conventionally, a projection TV, one type of video projector, uses three cathode ray tubes (hereinafter referred to as CRT) for color display in red, green, and blue (which three colors are hereinafter referred to as R.G.B). Individual CRT images projected on a screen are synthesized to give a color image. However, the use of CRT involves a limitation in itself because projection of CRT images on a screen does not always provide an image having high luminance and high resolution. Recently, therefore, it has been proposed to use a liquid crystal display device in place of CRT. For example, Japanese Patent Publication No. 60-3291/1985 discloses a video projector using a liquid crystal display device.

A projection TV using a typical conventional liquid crystal display device will be explained with reference to FIG. 1. Liquid crystal display devices 4-6 have their respective display regions provided on different substrates. A drive IC (not shown) for driving pixels in each display region is mounted on each of the substrates. Such liquid crystal device is disclosed in, for example, Japanese Patent Publication No. 60-220317/1985. A light beam from a light source 1 is divided into three by two half mirrors 3 and two mirrors 2 so as to be incident on the three liquid crystal devices 4-6. The display region of each liquid crystal device is controlled by the corresponding drive IC so that only the desired pixels transmit light. The light beams transmitted through the liquid crystal devices 4-6 are projected on a screen 10 by projection lenses 7-9 for R.G.B., to form an image thereon.

With such arrangement, however, there is a certain distance $d_1$, between the adjacent liquid crystal display devices. One reason is that a space is required for mounting a driving IC on each liquid crystal display device and also for formation of wiring thereon. Another reason is that a space is required for parts for fixing each LCD device (not shown) and parts for angular position adjustment. Therefore, a certain space must be provided between the projection lenses, resulting in the presence of an angle shown by $\theta_1$. This angle $\theta_1$ is a cause of a visual field angle trouble such that an image displayed may be seen redish or bluish according to the angle of view. Further, adjustment of relative angular position in all directions is required with respect to the three liquid crystal display devices to prevent color shifting on the screen. Such adjustment work requires considerable time and labor, and a large number of adjustment mechanisms. This is a serious problem indeed from the standpoint of production efficiency.

In the production of liquid crystal display devices, usually a plurality of arrays, each including drive IC mounting portions 12, wiring elements (not shown) for connecting terminal electrodes (not shown) of drive ICs and signal lines in display regions 13, are formed on one glass substrate 11, as shown in FIG. 2. FIG. 2 is a plan view showing four arrays formed on one substrate. The substrate is cut into the arrays. Then, a counter electrode substrate and drive ICs are mounted on each array to complete a liquid crystal display device. However, in the case of a liquid crystal display device of the active matrix type, in which switching elements are formed for driving individual pixels, more than tens of thousands of switching elements, such as thin film transistors (hereinafter to be referred to as TFT) must be formed for each display region. It is extremely difficult to form all the TFT's in one display region in such a way that they are characteristically uniform and defect-free. As such, there is a strong demand that as many arrays as possible are formed in one substrate so that they can be selectively used. With the conventional liquid crystal display devices, however, formation of 4 arrays in one substrate is the maximum possible limit, in view of the fact that the drive IC mounting portions must be formed. The drive IC mounting portions and wiring are formed of one or two layers of thin films, and accordingly they can be very easily formed. Therefore, it is unreasonable to form TFTs of the display region, the formation of which involves a very complex process, and the drive IC mounting portions on a same substrate.

It has been said that the production cost of a projection lens is proportional to 4 power of its diameter. Therefore, it is desirable to reduce lens diameter as far as possible. However, while the display region may be made smaller to some extent, the size of the drive IC's to be mounted may remain unchanged. Therefore, the drive IC mounting portions occupy a relatively large area.

For these reasons, it is impracticable to increase the number of arrays to be formed in one array. Therefore, the cost of array production is high, and it is extremely difficult to form all the TFTs on one display region characteristically uniform and defect-free.

SUMMARY OF THE INVENTION

One object of the present invention is to provide a low cost liquid crystal display device.

Another object is to provide a video projector using a liquid crystal display device which involves no trouble of color irregularity due to visual field angle and which permits easy adjustment of color shading.

The liquid crystal display device of the invention comprises a substrate having a plurality of wiring leads, and a liquid crystal display panel provided thereon which has a display region and a plurality of terminal electrodes. The wiring leads on the substrate and the terminal electrodes on the panel are connected each through a conductive bump and a conductive joint layer which are interposed between them. Preferably, the substrate has a recess or opening formed therein, and the liquid crystal display panel is partially inserted in the recess or opening.

The video projector in accordance with the invention comprises a light source, a first optical system which splits a light beam generated by the light source, a liquid crystal device of aforesaid construction which has a plurality of liquid crystal display panels for modulating the split light beams, and a second optical system which projects the modulated light beams on a screen.

BRIEF DESCRIPTION OF THE DRAWINGS

FIG. 3 is a plan view showing a liquid crystal display panel according to the invention;

FIG. 4 is a section along a line A—A' in FIG. 3;

FIG. 9 is a partial enlarged view of FIG. 7;

FIG. 12 is a partially enlarged plan view of FIG. 10;

DESCRIPTION OF THE PREFERRED EMBODIMENTS

Figure 1:
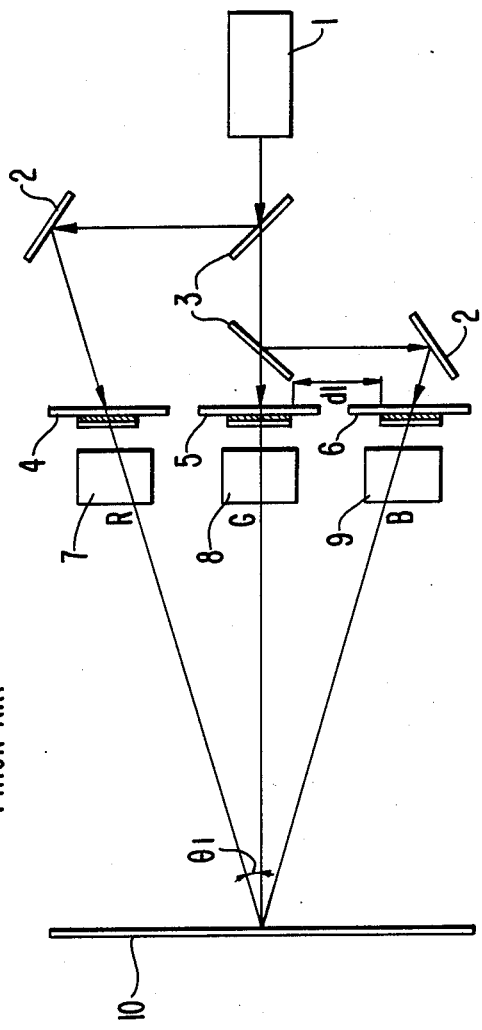
FIG. 1 is a schematic view showing a projection TV using a conventional liquid crystal display device.

FIG. 3 is a plan view of a liquid crystal display panel employed as a constituent of the liquid crystal display device in accordance with the invention. FIG. 4 is a section along a line A—A' in FIG. 3. In FIGS. 3 and 4, a substrate 14 is an insulating substrate or a semiconductor substrate such as, for example, silicon. The insulating substrate is made of glass. On the substrate 14 there are formed signal lines 16 arranged in the X direction (hereinafter referred to as X signal lines), signal lines 17 arranged in the Y direction (hereinafter referred to as Y signal lines), and terminal electrodes 19 for individual signal lines (hereinafter referred to as panel terminal electrodes). In case that the liquid crystal display panel is of the active matrix type, switch elements, such as thin film transistors (TFT), are formed to correspond to intersecting points of X and Y signal lines.

On each panel terminal electrode 19 there is provided a fine conductive bump (protrusion electrode) 20 having a thickness of 10 μm formed by using plating techniques or nail head bonding techniques. The conductive bump is preferably formed of gold from the standpoints of stability and bond performance. It is desirable that its diameter be not less than 10 μm and its thickness is not less than 20 μm. On each conductive bump 20 there is formed a layer 21 of a conductive adhesive having a thickness of 10 μm to 100 μm (hereinafter referred to as conductive joint layer). The conductive joint layer 21 is formed of an adhesive composed mainly of ultraviolet-curing resin, epoxy resin, or phenolic resin, mixed with such metal powder flakes as Ag, Au, Ni, C, or SnO$_2$, by using transfer or the like techniques. Liquid crystal 22 is sealed by a sealing resin 18, such as epoxy resin, between the substrate 14 and a transparent substrate 15 on which a transparent counter electrode comprised of ITO is formed (hereinafter referred to as counter electrode substrate).

Figure 5:
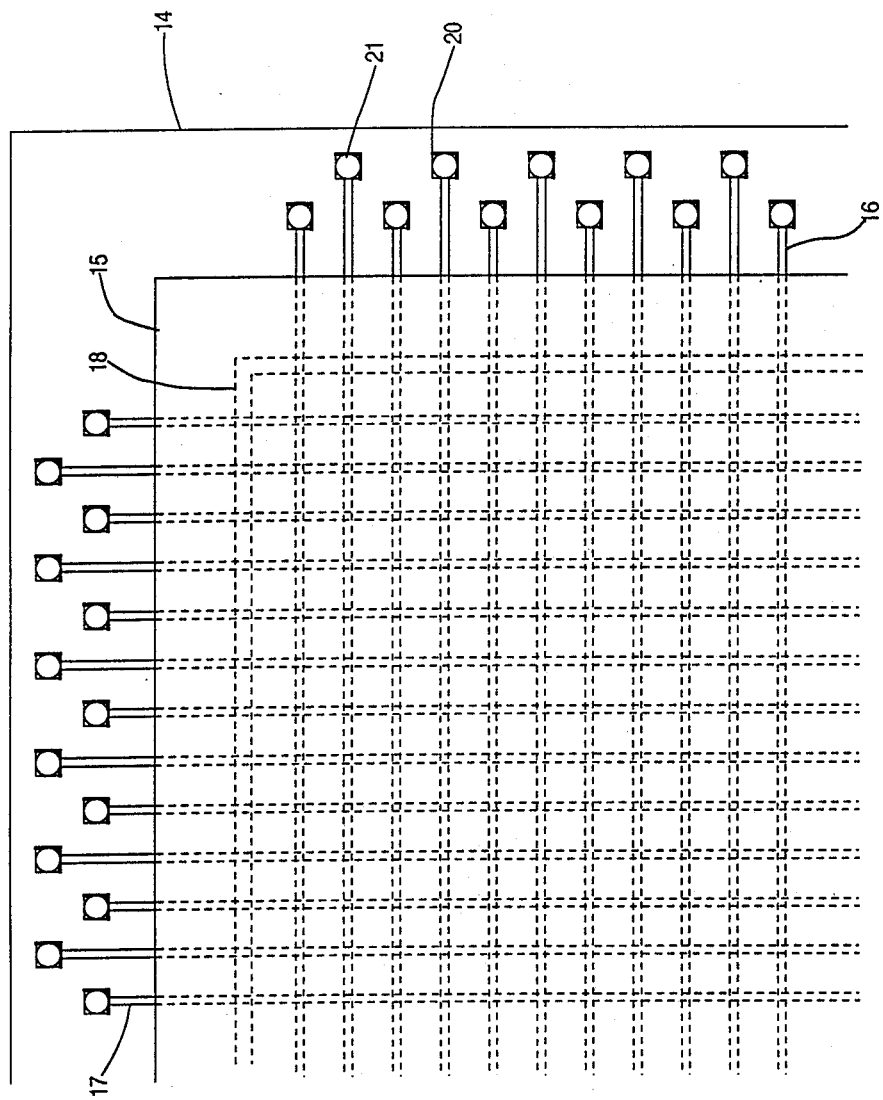
FIG. 5 is a partial enlarged view of FIG. 3.

The liquid crystal display panel in FIG. 3 is shown as having 10 X signal lines and 15 Y signal lines for easier understanding, but actually, as shown by a partially enlarged view in FIG. 5, the X and Y signal lines are of much greater density, say, usually 200 lines each. The distance between each two adjacent signal lines is at most 300 μm.

Figure 6:
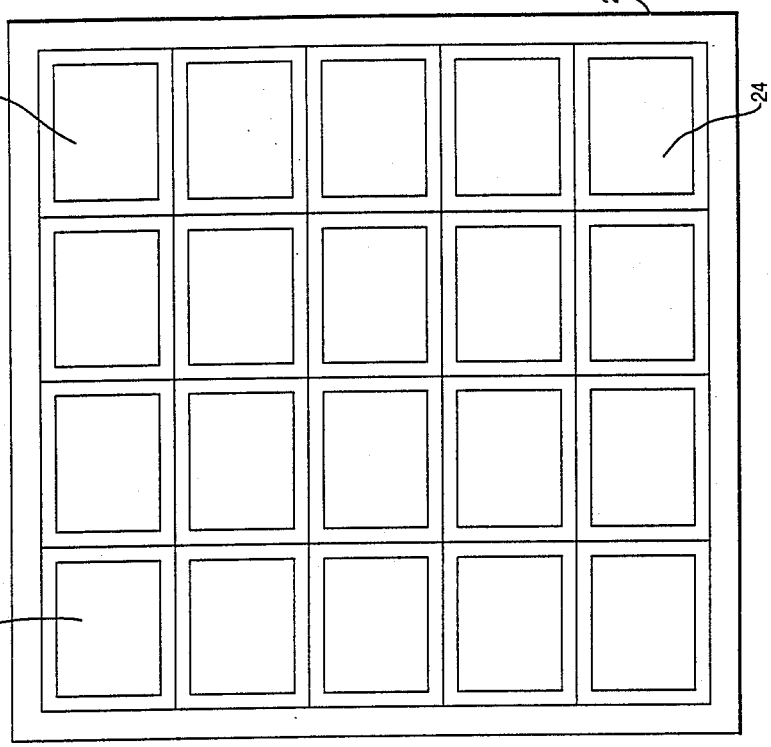
FIG. 6 is a plan view showing a liquid crystal display panel array according to the invention.
Figure 2:
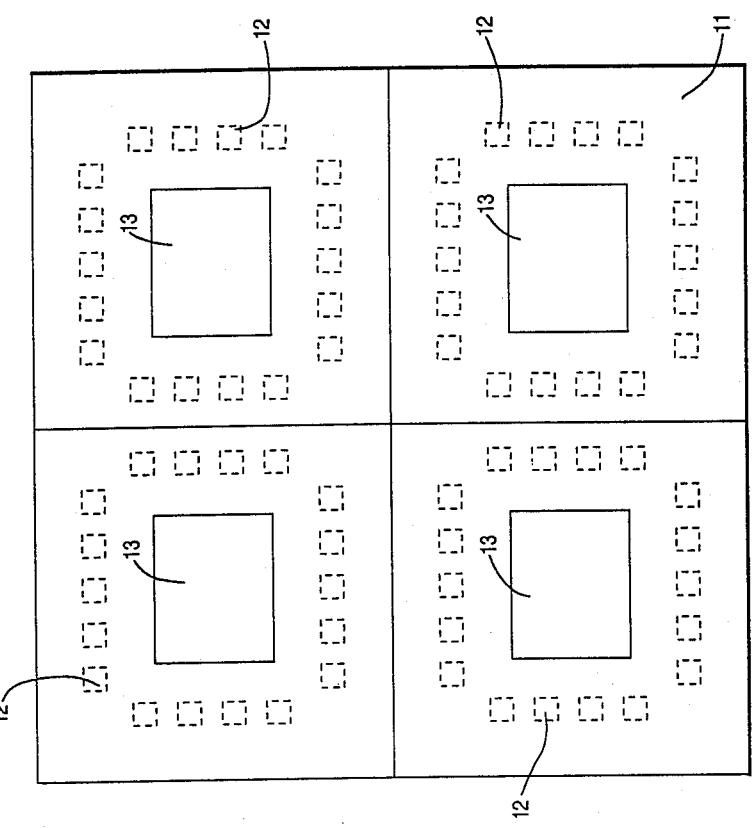
FIG. 2 is a plan view of a conventional array substrate for liquid crystal devices.

Now, the method of manufacturing the above described liquid crystal display panel will be explained. FIG. 6 is a plan view of a plurality of display regions 24 formed on one glass substrate 23. In each display region 24 there are formed the X, Y signal lines, panel terminal electrodes, and switching elements. Thereafter, the substrate 23 is cut into panels each including a display region, and an aligning layer is formed in each panel. Thereafter, spacers for defining the film thickness of liquid crystal are scattered on the display region, and then the counter electrode substrate 15 is mounted. Subsequently, the peripheral area of the counter electrode substrate is sealed by the sealing resin 18. After the resin is hardened, the air present between the counter electrode substrate 15 and the substrate 14 is released, and then the liquid crystal is injected. The conductive bump 20 is formed on each panel terminal electrode 19 by using plating techniques or nail head bonding techniques. Finally, the conductive joint layer 21 is formed on the conductive bump 20, whereby the liquid crystal display panel sown in FIGS. 3, 4 is completed.

Figure 8:
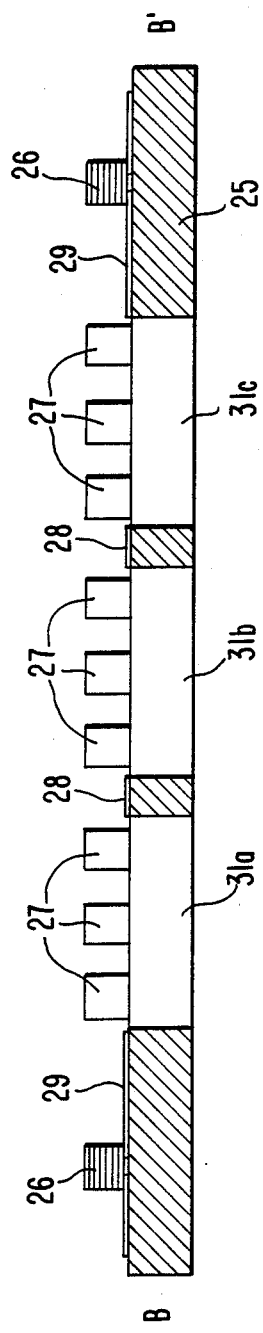
FIG. 8 is a section along a line B—B' in FIG. 7.
Figure 7:
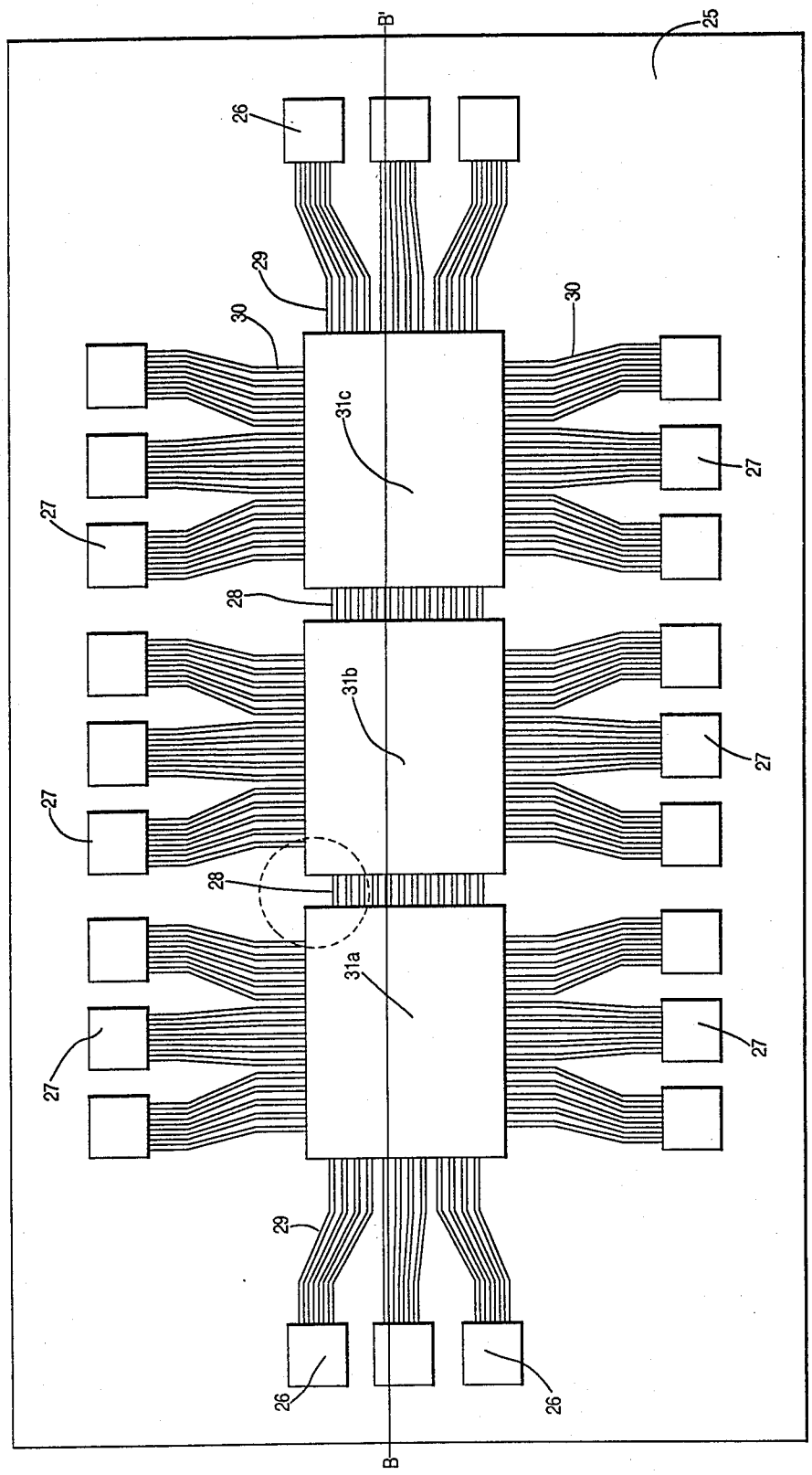
FIG. 7 is a plan view showing a drive substrate according to the invention.

FIG. 7 is a plan view of a substrate having a drive circuit, as a constituent element of the liquid crystal display device according to the invention (hereinafter referred to as drive substrate). FIG. 8 is a section along a line B—B' in FIG. 7. In FIGS. 7 and 8, a drive substrate 25 is an insulating substrate, which is preferably a glass substrate. Drive IC's 26 for applying control signals to the X signal lines of the liquid crystal display panel (hereinafter referred to as X signal line drive ICs) are arranged at side peripheral locations. At upper and lower peripheral locations on the drive substrate 25 there are disposed drive IC's 27 for applying control signals to Y signal lines of the liquid crystal panel (hereinafter referred to as Y signal line drive ICs). Three holes 31a–31c each for inserting therein the counter electrode substrate 15 of the liquid display panel are provided in a middle portion of the substrate 25. Between the individual adjacent holes there are formed wiring leads 28 for electrically connecting adjacent X signal lines of the liquid crystal panels (hereinafter X connection leads). Between the X signal line drive ICs 26 and the holes 31a, 31c there are formed X-wise signal supply leads 29 for supplying control signals to X signal leads of the liquid crystal display panels. Between the Y signal line drive ICs27 and the holes 31a–31c there are formed Y signal supply leads 30.

In FIG. 7, the numbers of the connection leads and signal supply leads are shown smaller than actual for the convenience of drawing and better understanding, but as shown in FIG. 9, which shows the dotted circle portion in FIG. 7 in an enlarged form, the connection leads 28 and the Y signal supply leads 30 are formed much more densely. This is also the case with the X signal supply leads, though not shown. As FIG. 9 shows, terminal electrodes (referred to as substrate terminal electrodes) 33 are formed at both ends of each of the X connection leads 28, and similarly substrate terminal electrodes 32 are formed at the hole-side ends of the individual Y signal supply leads 30. Similar terminal electrodes are also formed at the hole-side ends of the individual X signal supply leads, not shown though.

The X, Y signal line drive ICs are shown as having already been mounted, but alternatively they may be mounted after the liquid crystal display panels are mounted on the drive substrate. To prepare the drive substrate, a thin metal film is deposited on a glass substrate, and then the terminal electrodes and wiring leads are formed by etching.

Figure 10:
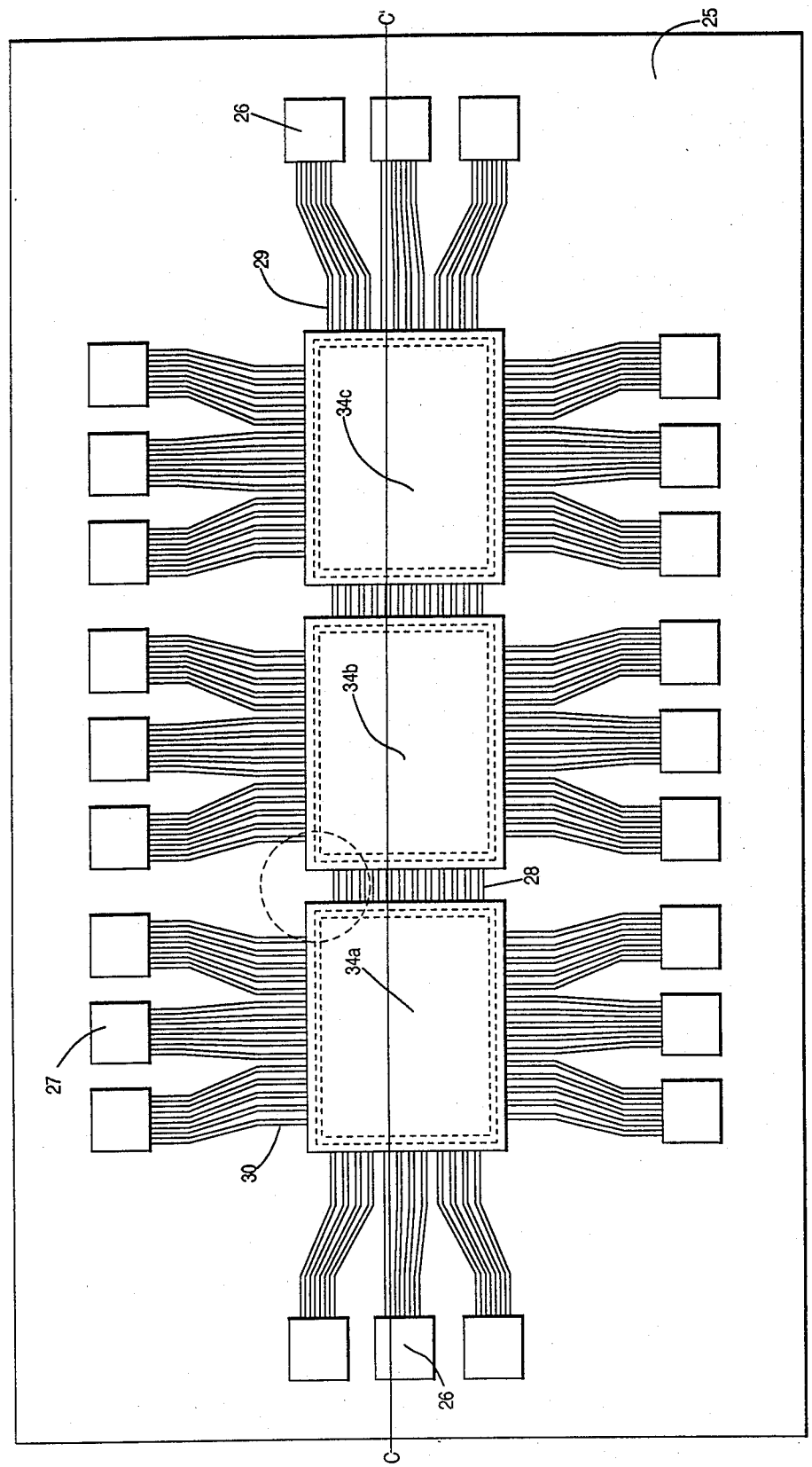
FIG. 10 is a plan view showing a liquid crystal display device representing one embodiment of the invention.
Figure 11:
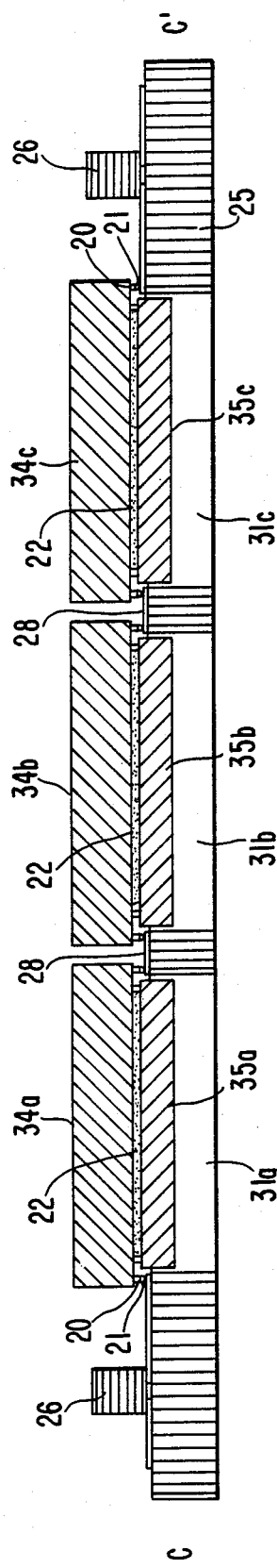
FIG. 11 is a section along a line C—C' in FIG. 10.

FIG. 10 shows a liquid crystal display device in which three liquid crystal display panels of the same arrangement as shown in FIG. 3 are mounted on the drive substrate shown in FIG. 7. FIG. 11 is a section taken along a line C-C' in FIG. 10. FIG. 12 is a partially enlarged view showing the dotted circle portion in FIG. 10. Liquid crystal display panels 34a-34c are mounted so that the respective counter electrode substrates are inserted in the holes 31a-31c shown in FIG. 7. To mount the liquid crystal display panels on the drive substrate, if the conductive joint layers 21 formed on the individual conductive bumps 20 of each liquid crystal display panel are of epoxy or phenolic resin, the panel terminal electrodes of the liquid crystal display panel are correspondingly positioned in opposed relation to the substrate terminal electrodes of the drive substrate. After the positioning is completed, the conductive joint layers 21 are hardened by heating. If the conductive joint layers 21 are of an ultraviolet curing resin, the panel terminal electrodes of the liquid crystal display panel are positioned in opposed relation with the substrate terminal electrodes of the drive substrate, and after the positioning is completed, the panel is irradiated by ultraviolet light from the back side of the drive substrate to harden the conductive joint layers 21.

A thin metal film, such as Au, Ni, ITO, Cu, Cr, or Ti, is formed on the substrate terminal electrodes 32, 33 of the driving substrate. In case that a thin Al film is formed, InSn is used as a material for the conductive joint layer 21, and alloy binding is carried.

In the above described way, the liquid crystal display panels can be mounted on the drive substrate, and thus signals from the driving ICs can be applied to the signal lines of the liquid crystal display panels.

As is apparent from the above description, the liquid crystal display device according to the invention is such that, as FIG. 6 illustrates, a plurality of liquid crystal display panels are prepared from one substrate, and then mounted in position on the drive substrate. Therefore, the invention provides the following advantages.

First, a plurality of display regions can be formed in one substrate. Therefore, the cost of production of the liquid crystal display panels can be considerably reduced.

Another advantage is that since only display regions are formed on one substrate, the necessity of forming wirings for the driving ICs and switching elements constituting display region on the same substrate, which is the case with the prior art, is eliminated. This makes it possible to manufacture the driving substrates and the display region substrates under optimum conditions according to their respective requirements. Thus, the defective occurrence rate of the switching elements in the display regions can be remarkably reduced.

Conventionally, the selection of the good liquid crystal display devices are determined only after the switching elements in the display regions are operated by the driving ICs to test the condition of their performance. In the case of the conventional liquid crystal display devices, when determined as defective after they have been completed, there are no choice but throwing them away. However, the liquid crystal display device of the present invention makes it possible to use such simple and convenient measures as temporary connection. Therefore, if a liquid crystal display panel is found defective, only the defective liquid crystal display panel may be thrown away. Hence, the invention can remarkably contribute to the reduction of manufacturing cost of the liquid crystal display devices.

In this conjunction, the method of the temporary connection will be explained. First, the liquid crystal display panel shown in FIG. 3 is positioned relative to the driving substrate shown in FIG. 7 so that their respective sets of terminal electrodes are correspondingly opposed. Since the conductive bumps 20 are formed of such soft metal as gold or iridium, they become readily deformed due to the weight of the panel so that the wiring terminal electrodes 32 of the driving substrate and the panel terminal electrodes 19 of the liquid crystal display panel are electrically connected. In this case, the conductive joint layers are in the unhardened condition; therefore, the liquid crystal display panel can be easily removed. If necessary, a slight degree of heat may be applied so that the conductive joint layers 21 is tentatively hardened. Then, the drive ICs are operated to apply signals to the liquid crystal display panel, thereby the switching elements in the display regions are actuated. From the condition of display observed through this tentative connection, whether the panel is satisfactory or defective can be readily judged. If the panel is found defective, then it is removed and another liquid crystal display panel is mounted; and the above described procedure is repeated.

In this way, even where many liquid crystal display panels are mounted, the liquid crystal display device on which completely satisfactory liquid display panels are mounted can be obtained by carrying out the aforesaid simple operation. As such, this tentative operation is also effective in sorting liquid crystal panels in order to equalize the display condition of three display regions, R, G, and B in the case of liquid crystal display devices for use in projection TVs, in which the characteristics of the switching elements in the three regions must be uniform, or otherwise there may be causes color shading.

Figure 13:
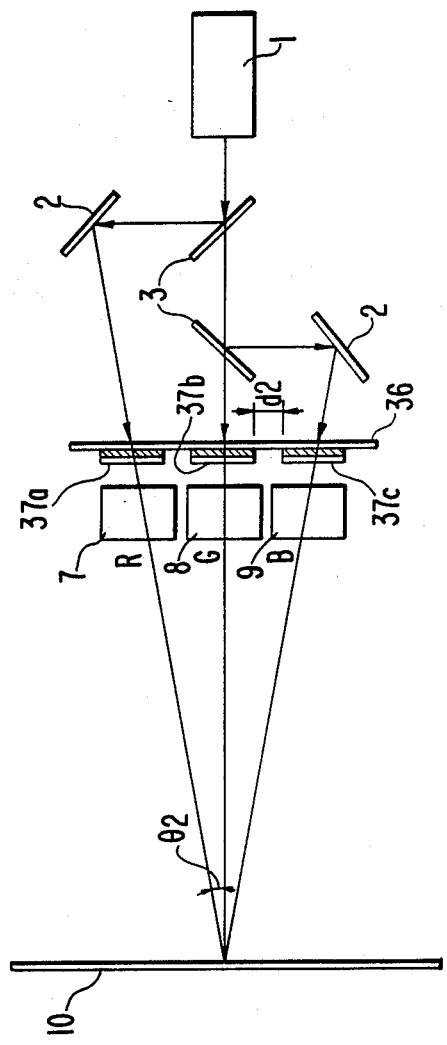
FIG. 13 is a schematic view showing the arrangement of a projection TV using the liquid crystal display device.

FIG. 13 is a schematic view showing the arrangement of a projection TV using the liquid crystal display device of the invention. A light source 7 usually containing a xenon lamp or the like, generates a light beam of high luminance. The light beam from the light source 7 is divided into three by means of two half mirrors 3 and two mirrors 2. The divided light beams are respectively caused to become incident on three display regions 37a-37c of the liquid crystal display device 36. The individual display regions are controlled by drive ICs (not shown) so that only the desired pixel region or regions transmit the light. The transmitted light rays are collected respectively by projection lenses 7-9 and projected on a screen 10 to form an image on the screen.

Figure 14:
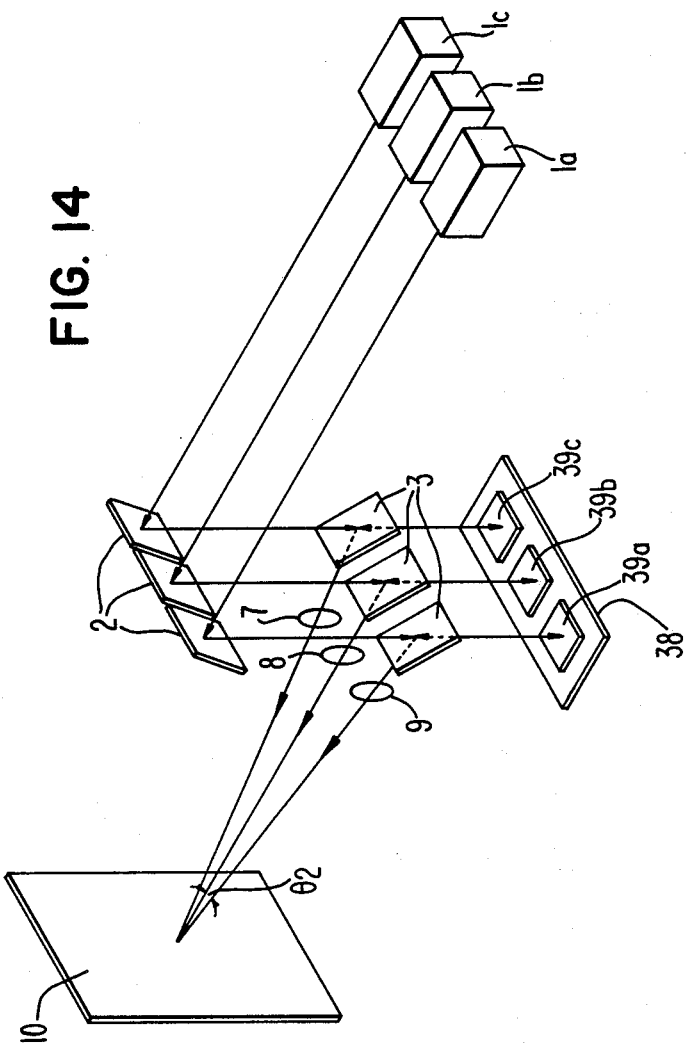
FIG. 14 is a schematic view showing the arrangement of a projection TV using a reflection-type liquid crystal display device of the invention.

The liquid crystal device of the invention is not limited to such device of the transmission type which allows light beams to be transmitted through specified regions only. For example, the device of the invention can be adapted to be employed as a liquid crystal display device of the reflection type which reflects light beams. FIG. 14 illustrates an arrangement of a projection TV in which the liquid crystal display device of the invention is designed to be employed as a device of the reflection type. In FIG. 14, light beams from light sources 1a–1c are deflected away from their path by mirrors 2, transmitted through half mirrors 3, and become incident on the display regions 39a–39c of the reflective type liquid crystal device 38. The device 38 reflects light beams incident on specific pixel regions only. The light rays so reflected are subjected to reflection by the half mirrors 3, and collected by projection lenses 7, 8, 9 so as to be projected on a screen 10, an image thus appearing on the screen.

By being employed in a projection TV as described above, the liquid crystal device provides the following advantages. In the liquid crystal display device, the X signal lines of individual liquid crystal display panels are rendered common by the X connection leads 28 formed on the drive substrate. Therefore, as compared with the conventional arrangement, in which X signal line drive ICs are mounted independently on individual liquid crystal display devices, the present invention assures considerable decrease in the number of ICs to be used.

Another advantages is that since the distance $d_2$ between individual liquid crystal display panels can be made very small, angle $\theta_2$ shown in FIGS. 13 and 14 may be made very small accordingly. Therefore, the possibility of picture color variation due to the angle of view, which has been the case with the prior art, is eliminated.

Another advantage is that since three liquid crystal display panels are mounted on the drive substrate, three display regions can be adjusted all at once in angle and position simply by making position adjustment of the drive substrate. Therefore, needs for adjustment mechanisms can be considerably reduced, and accordingly the time required for the adjustment can be considerably reduced.

Figure 15:
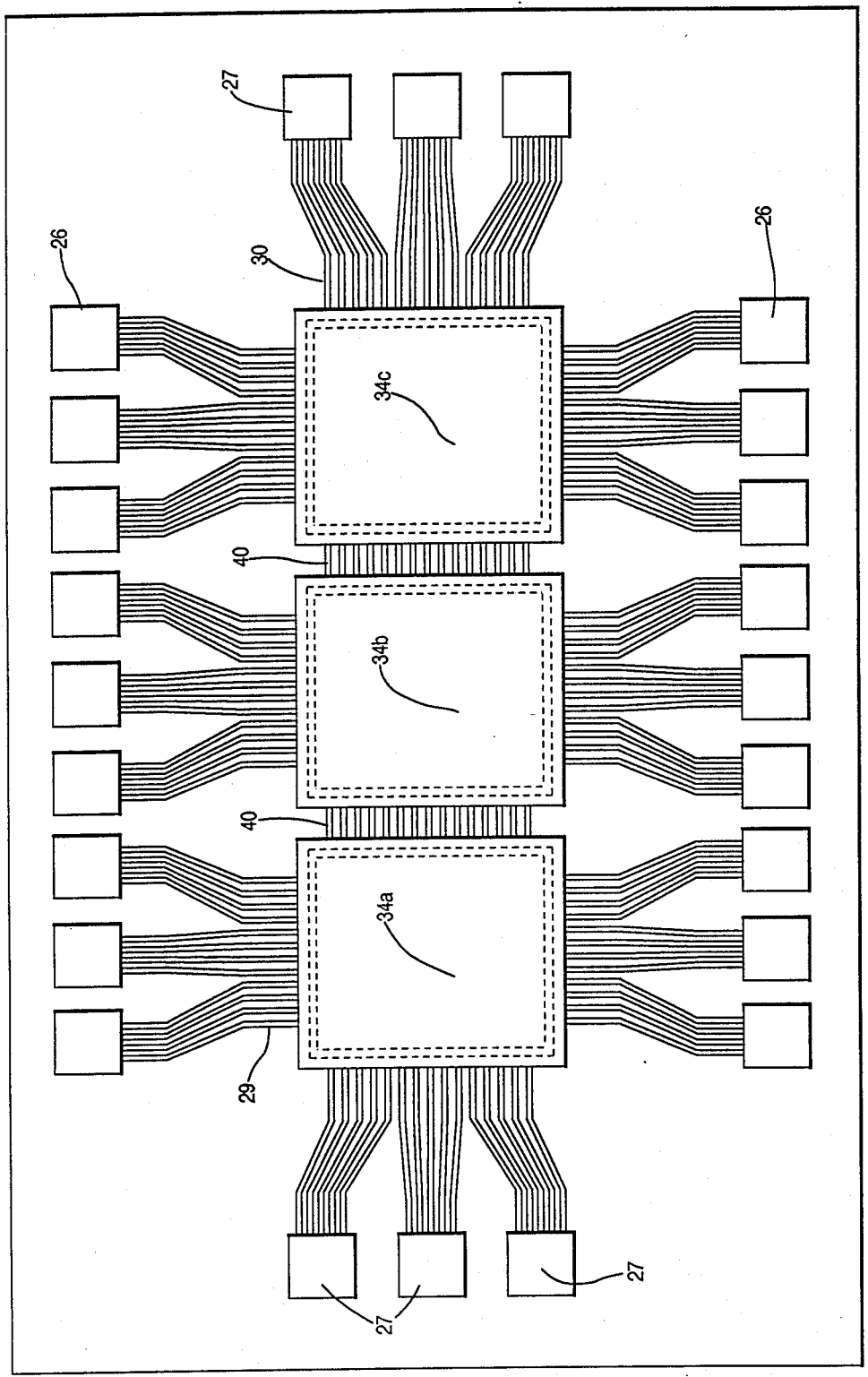
FIG. 15 is a plan view showing a liquid crystal display device in another embodiment of the invention.

FIG. 15 is a plan view showing another form of liquid crystal display device embodying the invention. In FIG. 15, three liquid crystal display panels 34a–34c of the FIG. 3 arrangement are mounted on the drive substrate 25, and the Y signal lines 17 on the individual liquid crystal display panels are made common by Y connection leads 40 formed on the drive substrate 25'. Further, the X signal line drive ICs 26 are mounted at upper and lower peripheral locations on the drive substrate, and the Y signal line drive ICs 27 are mounted at right and left side peripheral locations.

Figure 16:
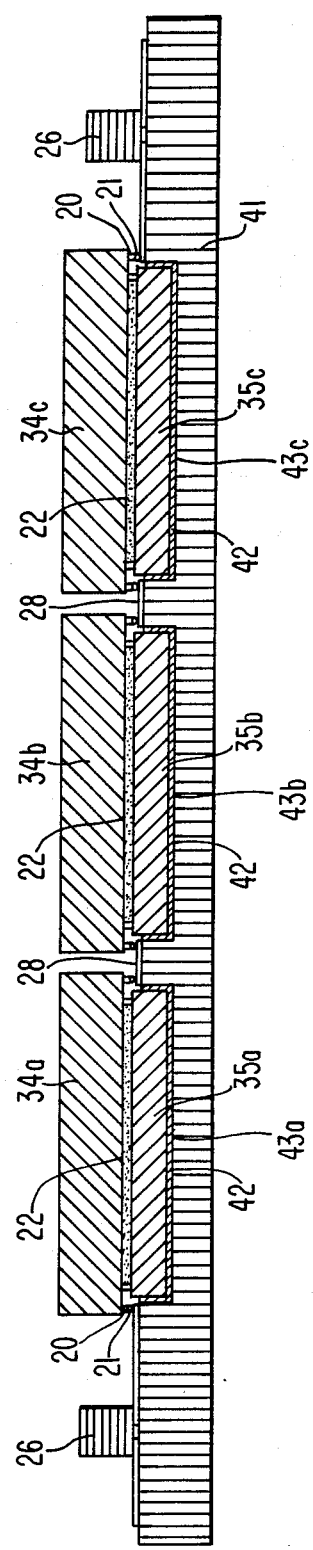
FIG. 16 is a sectional view showing a liquid crystal display device in still another embodiment of the invention.

In the embodiment described so far, the through-holes are provided for insertion of the counter electrode substrates of the liquid crystal display panels, but as FIG. 16 shows, recessed portions 43a–43c may be provided in place of the through-holes. In FIG. 16, resin 42 is provided between each of the recessed portions 43a–43c and the counter electrode substrate inserted therein. The resin 42 serves to prevent refraction and/or reflection of the light incident on the drive substrate, and also serves as a buffer for the liquid crystal panel against vibration and mechanical impact. For the resin 42, preferably silicone resin in gel form is used, which provides good light transmittance.

Figure 17:
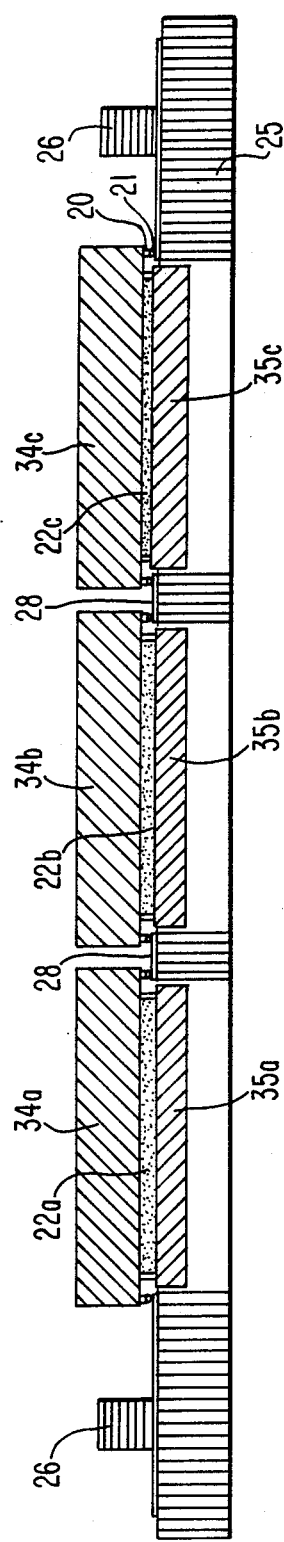
FIG. 17 is a sectional view showing a liquid crystal display device in a further embodiment of the invention.

Further, there is a suitable layer thickness of liquid crystal which is effective in controlling various wave lengths of light to an optimum level. For example, as shown in FIG. 17, the layer thickness of the liquid crystal 22a for the liquid crystal panel 34a for R is made thicker than the layer thickness of the liquid crystal 22b for the liquid crystal panel 34b for G, and the layer thickness of the liquid crystal 22c for the liquid crystal panel 34c for B is made thinner than that of the liquid crystal 22b. By using the liquid crystal display panels of such liquid crystal layer thickness arrangement, it is possible to obtain a projection TV having good color reproduction.

Figure 19:
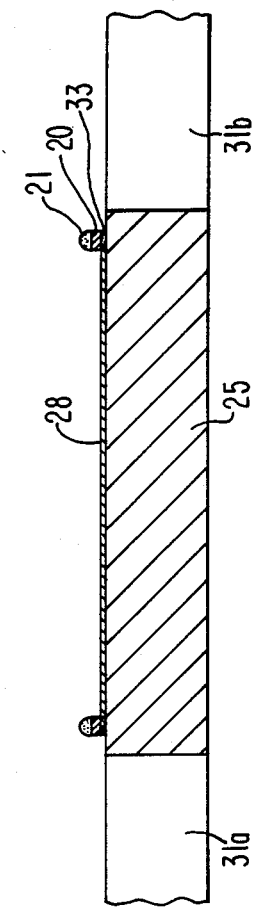
FIGS. 19 and 20 are section along a line D—D' in FIG. 18.
Figure 20:
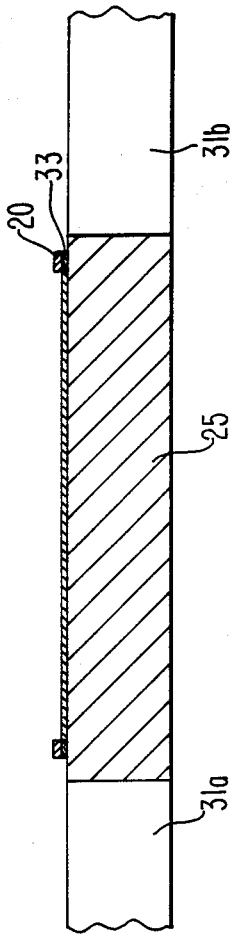
Figure 18:
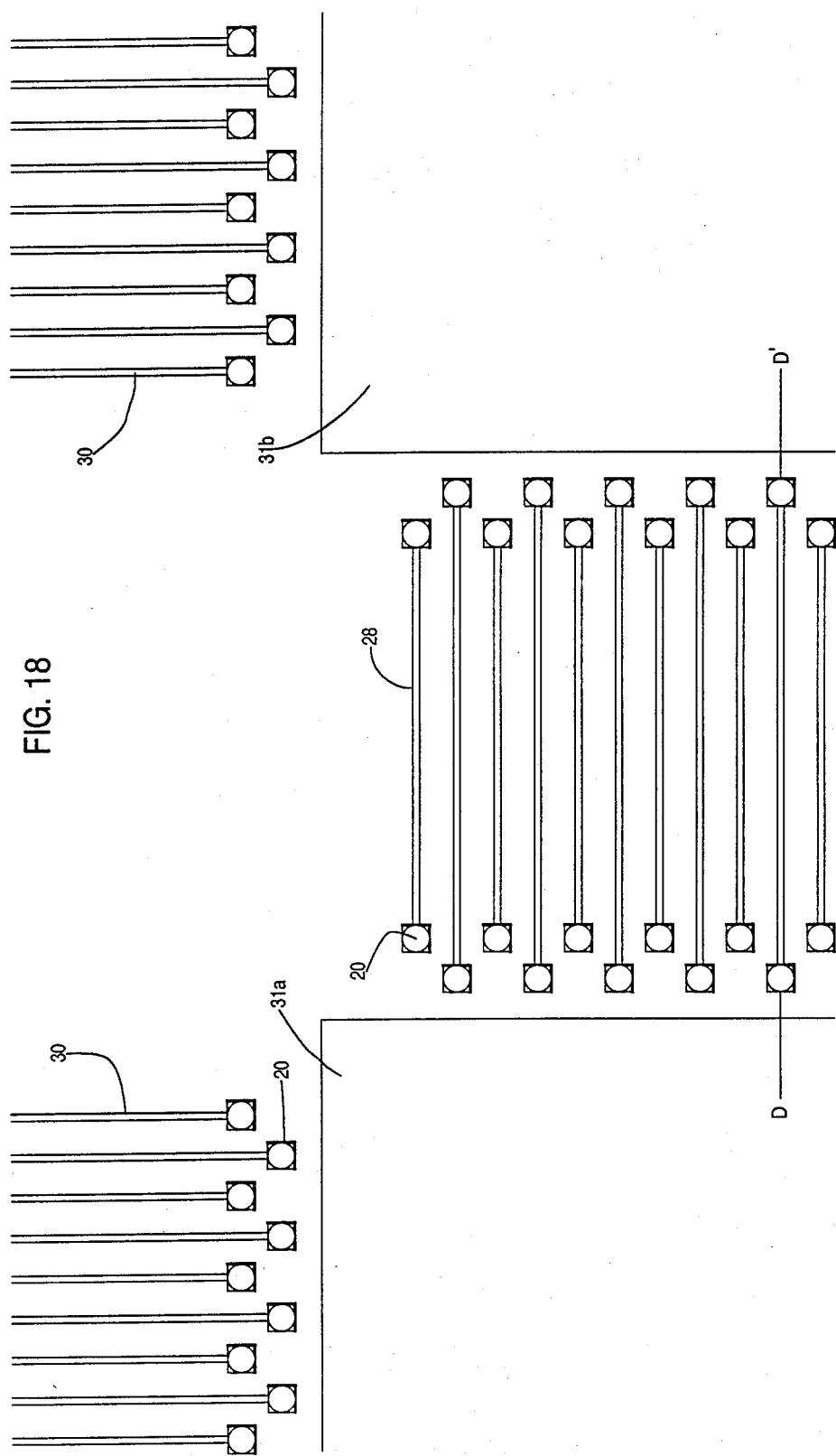
FIG. 18 is a partially enlarged plan view of FIG. 7 showing a further embodiment.

In the embodiments thus far described, the conductive bump 20 is formed on each panel terminal electrode 19 of the liquid crystal display panel. Alternatively, for example, as shown in FIG. 18 and FIG. 19, which represents a section along a line D—D' in FIG. 18, the conductive bump 20 may be formed on the substrate terminal electrode 33, and the conductive joint layer 21 may be formed on the conductive bump 20. As FIG. 20 sectional view shows, the conductive bump 20 may be formed on the substrate terminal electrode 33, and the conductive joint layer 21 may be formed the panel terminal electrode 19 of the liquid crystal display panel.

What is claimed is:

1. A liquid crystal display device comprising:
   a substrate having a plurality of recesses or openings formed therein,
   a plurality of liquid crystal display panels respectively partially inserted in said plurality of recesses or openings thereby to be mounted on said substrate, each of said display panels having a liquid crystal display region having a plurality of terminal electrodes,
   a drive circuit provided on said substrate for generating drive signals for driving said liquid crystal display panels,
   a plurality of first wiring leads formed on said substrate for electrically connecting said plurality of liquid crystal display panels and said drive circuit, each of said first wiring leads being connected at one end thereof to said drive circuit, and
   a plurality of second wiring leads formed on said substrate for electrically connecting adjacent two of said plurality of liquid crystal panels to each other,
   the other end of each of said plurality of first wiring leads and a corresponding one of said plurality of terminal electrodes being connected to each other through interposed conductive bump and conductive joint layer which are connected with each other, and each end of each of said plurality of second wiring leads and a corresponding one of said plurality of terminal electrodes being connected to each other through interposed conductive bump and conductive joint layer which are connected with each other.

2. The liquid crystal display device according to claim 1, wherein the conductive bump is formed on one end of each of said plurality of terminal electrode, and the conductive joint layer is formed on said conductive bump.

3. The liquid crystal display device according to claim 1, wherein the conductive bump is formed on said other end of each of said plurality of first wiring leads and also on each of the both ends of each of said plurality of second wiring leads, and the conductive joint layer is formed on said conductive bump.

4. The liquid crystal display device according to claim 1, wherein a part of said plurality of first wiring leads and all of said plurality of second wiring leads are electrically connected through electrodes disposed in the respective liquid crystal regions of the liquid crystal panels interposed therebetween so that drive signals given to said part of said plurality of first wiring leads are applied commonly to all of said plurality of liquid crystal display panels.

5. The liquid crystal display device according to claim 1, wherein each of the liquid crystal display panels is of such construction that liquid crystal is inserted between a first substrate having a switching array and a group of cross electrodes and a second substrate having a transparent counter electrode, a part of said second substrate being inserted in one of said recesses or apertures.

6. The liquid crystal display device according to claim 1, wherein each of said liquid crystal display panels is of the active matrix type.

7. The liquid crystal display device according to claim 5, wherein the number of the liquid crystal display panels is three.

8. The liquid crystal display device according to claim 7, wherein said three liquid crystal display panels are different from one another in the thickness of their liquid crystal layers.

9. The liquid crystal display device according to claim 1, wherein the conductive bump is a metal bump and has a height of at least 10 $\mu$m.

10. The liquid crystal display device according to claim 1, wherein the conductive joint layer is formed of a resin mixed with carbon or metallic powder.

11. The liquid crystal display device according to claim 10, wherein the resin is a ultraviolet-curing resin.

12. The liquid crystal display device according to claim 10, wherein the resin is composed principally of at least one kind of resin selected from the group consisting of epoxy resins and phenolic resins.

13. The liquid crystal display device according to claim 1, wherein the substrate is an insulating substrate.

14. The liquid crystal display device according to claim 13, wherein the substrate is a glass substrate.

15. The liquid crystal display device according to claim 1, wherein the substrate has a plurality of recesses formed therein, and wherein said plurality of liquid crystal display panels are respectively partially inserted in said plurality of recesses through a buffer resin layer.

16. The liquid crystal display device according to claim 15, wherein said resin layer has a light transmission property and is gelatinous.

17. The liquid crystal display device according to claim 16, wherein the resin is a silicone resin.

18. A video projector comprising a light source for generating a light beam, a first optical system for splitting the light beam from the light source into a plurality of light beams, modulation means for modulating the split light beams, and a second optical system for projecting the split light beams onto a screen to form an image, said modulation means being a liquid crystal display device comprising:

a substrate having a plurality of recesses or openings formed therein, a plurality of liquid crystal display panels respectively partially inserted in said plurality of recesses or openings thereby to be mounted on the substrate, each having a liquid crystal display region having a plurality of terminal electrodes, a drive circuit provided on said substrate for generating drive signals for driving said liquid crystal display panels so as to modulate the split light beams, and a plurality of wiring leads formed on said substrate for interconnecting said plurality of liquid crystal display panels and said drive circuit, and adjacent two liquid crystal display panels of said plurality of liquid crystal display panels, one end of each of said plurality of wiring leads and a corresponding one of said plurality of terminal electrodes being connected to each other through interposed conductive bump and conductive joint layer which are connected with each other.

19. The video projector according to claim 18, wherein the liquid crystal display panels are three liquid crystal display panels provided correspondingly to colors of red, green, and blue.

20. The video projector according to claim 18, wherein the conductive bump is formed on one end of each of said plurality of terminal electrodes, and the conductive joint layer is formed on the conductive bump.

21. The video projector according to claim 18, wherein the conductive bump is formed on one end of each of said plurality of wiring leads, and the conductive joint layer is formed the conductive bump.

* * * * *